United States Patent
Pappas et al.

[11] Patent Number: 6,024,807
[45] Date of Patent: Feb. 15, 2000

[54] PROCESS FOR MANUFACTURING AN ELECTRODE FOR AN ELECTROCHEMICAL DEVICE

[75] Inventors: Nicholas Pappas, Ecublens; Michael Grätzel, St-Sulpice, both of Switzerland

[73] Assignee: Ecole Polutechnique Federale de Lausanne, Lausanne, Switzerland

[21] Appl. No.: 09/043,618

[22] PCT Filed: Sep. 25, 1995

[86] PCT No.: PCT/IB95/00786

§ 371 Date: Mar. 24, 1998

§ 102(e) Date: Mar. 24, 1998

[87] PCT Pub. No.: WO97/12382

PCT Pub. Date: Apr. 3, 1997

[51] Int. Cl.[7] .................................................. H01M 4/92
[52] U.S. Cl. ........................... 148/513; 75/369; 148/537; 148/678; 427/125; 427/383.3; 429/41; 429/44; 502/101; 502/339
[58] Field of Search ............................ 75/369; 148/513, 148/537, 678; 427/125, 383.3; 429/41, 44; 502/101, 339

[56] References Cited

U.S. PATENT DOCUMENTS

| | | | |
|---|---|---|---|
| 4,808,493 | 2/1989 | Breault | 429/44 |
| 5,494,704 | 2/1996 | Ackerman | 427/125 |
| 5,786,026 | 7/1998 | Seko et al. | 429/40 |
| 5,879,828 | 3/1999 | Debe et al. | 429/41 |
| 5,910,378 | 6/1999 | Debe et al. | 429/41 |

FOREIGN PATENT DOCUMENTS

| | | |
|---|---|---|
| 91/16719 | 3/1991 | WIPO . |

OTHER PUBLICATIONS

*Scientific American*, vol. 266, No. 1, Jan. 1992, "Curent Event–Bright Future for a Photovoltaic Cell", p. 117.

Nakato, Y., et al., "A New Approach to an Efficient . . . with Ultrafine Metal Islands", *Japanese J. of Applied Physics*, vol. 28, No. 2, Feb. 1989, pp. 261–2.

*Primary Examiner*—George Wyszomierski
*Attorney, Agent, or Firm*—Woodard, Emhardt, Naughton Moriarty & McNett Patent and Trademark Attorneys

[57] ABSTRACT

The present invention aims at improving the catalytic activity of the metallic platinum deposited on the substrate of the counterelectrode (i.e., the cathode), so as to obtain a high value of the catalytic activity on the reduction reaction of triiodide to iodide essentially independent of the nature of the solvent used in the electrolyte. To that effect, the manufacturing process according to the invention is characterized in that said metallic platinum is deposited in the form of a plurality of spheroidal microcrystallite clusters each having a size of less than about 100 nanometers, dispersed over the surface of said substrate, and in that said deposited metallic platinum is submitted to a thermal treatment, carried out at a temperature in the range of about 375° to 400 C., so as to enhance the catalytic properties of the platinum on the oxido-reduction of iodine and triiodide $3I_2 + 2e \rightarrow 2I_3$ in the redox system iodine/iodide.

10 Claims, No Drawings

PROCESS FOR MANUFACTURING AN ELECTRODE FOR AN ELECTROCHEMICAL DEVICE

The invention relates to a process for manufacturing an electrode for an electrochemical device which comprises two electrodes, having corresponding electrochemically active surfaces arranged in mutual facing relationship and separated by a layer of an electrolyte comprising a solution of an electron transfer mediator, consisting of a redox system iodine ($I_2$)/iodide ($I^-$), in a solvent, said process comprising the step of depositing metallic platinum onto an electrically conductive substrate.

A variety of such electrochemical device are already known and widely used, e.g. in the form of photoelectrochemical energy conversion apparatus utilizing a iodine/iodide redox couple as mediator, as well as of sensor devices or other iodine/iodide mediated electrochemical devices involving electrochromism, charge or energy storage or energy conversion, such as fuel cells.

The invention is, more particularly, useful for manufacturing a cathode for a photovoltaic cell of the type disclosed in International Patent Application WO 91/16719 (Grätzel et al.).

In this photovoltaic cell, at least one of said electrodes has a visible light transmittance of at least 60% and said electrode is the cathode, the other electrode of the cell consisting in a photoanode comprising a high surface area semiconducting titanium dioxide active layer, which is in contact with the electrolyte and which is preferably coated with a layer of a photosensitizer such as a transition metal complex.

The iodine/iodide redox couple mediates the transfer of electrons from the external circuit required for the regeneration of the oxidized state of the photosensitizer after electron injection into the active layer of semiconducting titanium dioxide.

During the mediator regenerative cycle, the oxidized species, namely iodine or triiodide, must be converted back, i.e. reduced, to iodide, according to the reactions $3I_2 + 2e^- \rightarrow 2I_3^-$ and $I_3^- + 2e^- \rightarrow 3I^-$, at minimum energy loss, on the cathode.

The cathode of the above-mentioned photovoltaic cell is preferably constituted by a transparent support plate made of a conductive material, such as an electric conducting glass, coated with a layer of electric conducting tin oxide or indium-tin oxide which is, in turn, coated with metallic platinum.

Optionally, the metallic platinum coating may be applied directly onto the surface of a support plate made of electric conducting glass.

Different methods are known for applying the metallic platinum coating onto the surface of the support plate, in particular a method of electrochemical deposition.

The aim of providing the surface of the cathode which is in contact with the electrolyte with such metallic platinum coating is to improve the kinetic performance of said cathode, i.e. to increase the exchange current of the reaction of reduction of triiodide to iodide, by catalyzing tis reaction, so as to reduce the voltage consumption at the cathodic surface and consequently, increase the electrical power delivered by the photovoltaic cell for a given energy conversion efficiency of the photoanode.

However, the catalytic activity of the metallic platinum coatings, obtained by any of the know methods, on the reaction of reduction of triiodide to iodide is insufficient for allowing obtention of a substantial reduction of the voltage consumption at the cathodic surface.

Furthermore, this catalytic activity depends on the nature of the solvent used in the electrolyte. More particularly, the catalytic activity is lower in the case when such organic solvents as nitroethane, propylene carbonate, ethylene carbonate, n-methyl-pyrrolidone and n-methyl-oxazolidone are used than in the case when the solvent of the electrolyte is acetonitrile.

The present invention aims at improving the catalytic activity of the metallic platinum deposited on the substrate of the counterelectrode (i.e. the cathode) so as to obtain a high value of the catalytic activity on the reduction reaction of triiodide to iodide essentially independent of the nature of the solvent used in the electrolyte.

To that effect, the manufacturing process according to the invention is characterized in that said metallic platinum is deposited in the form of a plurality of spheroidal microcrystallite clusters each having a size of less than about 100 nanometers, dispersed over the surface of said substrate, and in that said deposited metallic platinum is submitted to a thermal treatment, carried out at a temperature in the range of about 375 to 400° C., so as to enhance the catalytic properties of the platinum on the oxido-reduction reaction of iodine and triiodide $3I_2 + 2e^- \rightleftharpoons 2I_3^-$ in the redox system iodine/iodide.

For carrying out the step of depositing metallic platinum onto the electrically conductive substrate, in accordance with the invention, one may use any method which permit deposition of the metallic platinum in the form specified above, i.e. a plurality of discrete spheroidal microcrystallite clusters each having a size of less than about 100 nanometers, dispersed over the surface of the substrate.

Preferably one may use either a first method comprising a step of depositing metallic platinum on the substrate by thermal decomposition of a solution of at least one halogenated platinum compound of a second method according to which metallic platinum is deposited by first applying onto the substrate a suspension of fine platinum particles, each halving a size of less than 100 nanometers, in a liquid suspension medium, and then heating the suspension so as to evaporate the liquid suspension medium.

In the case of said first method, the halogenated platinum compound is preferably selected from platinum tetrachloride and hexachloroplatinic acid and the solvent of said solution is preferably an anhydrous solvent such as anhydrous iso-propanol.

In the case of said second method, the liquid suspension medium is, for instance, dimethylformamide and the suspension may further contain an organic ligand, such as a salt of tetrabutylammonium, by way of stabilizing agent for the platinum particles.

When such organic ligand is present in the suspension, said second method preferably comprises the steps of evaporating the liquid suspension medium by beating the suspension, applied on the surface of the cathode substrate, at a first temperature, and then removing said ligand by heating the dried suspension layer, on said substrate, at a second temperature.

Preferably said first temperature is of the order of 150° C. and said second temperature is in the range of 300 to 350° C.

The duration of the heating period at said second temperature may appropriately be of the order of several hours, e.g. 12 hours.

As can be seen by way of micrographic or microscopic observations, the structure of the active surface of the electrode obtained by the process of the invention comprises small naked pure metallic platinum crystalline clusters or microcrystallites having a size of less than about 100 nanometers with a size distribution centered around 5 nanometers, sparsely dispersed over the electrode surfaces without substantial mutual contact of two adjacent platinum clusters. Each of these plating clusters has a generally spheroidal shape and appears to be formed of a plurality of randomly oriented crystallites, with crystal lattice planes exposed on the exterior surface of the clusters.

It is to be noted that the contact surfaces of each of these clusters with the surface of the substrate appear to be of relatively limited area in comparison with the whole exterior surface area of the corresponding clusters The rest of the substrate surface appears to be devoid of detectable platinum. In other words, there seems to be no continuous metallic platinum layer on the electrode surface The invention will now be illustrated by the following examples:

EXAMPLE 1

A cathode for a photovoltaic cell of the type disclosed in International Patent Application WO 91/16719 is prepared as follows:

A substrate for the cathode is first prepared by washing, in pure anhydrous acetonitrile, a plate of a size of 2×2 cm cut in a sheet of conducting glass (manufactured by the Japanese firm ASAHI Glass Corporation), having a specific area resistance of 10 Ohm, and then drying the thus washed plate in air.

An amount of 10 microliters by $cm^2$ of a precursor solution of 5 M of hexachloroplatinic acid in anhydrous iropropanol is subsequently applied, by spraying, on the surface of the thus prepared substrate preheated at a temperature of 50° C. and left to dry in air for 3 minutes.

The thus coated plate is then placed in a hot air furnace, where the temperature is gradually increased and left to stabilize at 385° C., and the plate is allowed to cure, at the latter maximum temperature, for 10 minutes. This step results in the complete thermal decomposition of the hexachloroplatinic acid into metallic platinum in the form of discrete microcrystallites having a size in the range below about 100 nanometers.

After expiry of the curing period, hot air flow is ceased and the still hot platinum coated plate is transferred into a closed glass vessel until thermal equilibrium is reached.

The thus prepared cathode is then assembled with a photoanode and brought in contact with a iodine/iodide electrolyte so as to form a photovoltaic cell in the manner described in Example 36 of the above indicated International Patent Application.

EXAMPLE 2

Another cathode suitable for use in a photovoltaic cell of the type disclosed in International Patent Application WO 91/16719 is prepared in a manner similar as that indicated in Example 1 but using, as precursor solution applied to the substrate, a suspension of fine metallic platinum particles, forming small clusters of a size in the order of 6 nanometers, in dimethyl formamide, said clusters being stabilized by an organic ligand consisting of tetrabutylammonium bromide.

The solvent of the suspension medium is dried off under vacuum at a temperature of 150° C. and then the organic ligand is removed by heating the plate in air, at a temperature comprised in the range of 300 to 350° C., for 12 hours.

Finally, the plate, thus coated with metallic platinum, is submitted to the same thermal treatment, comprising curing in hot air at a temperature of 385° C., as that described in Example 1.

EXAMPLE 3

The improvement of catalytic activity of the metallic platinum present on the active surface of an electrode Manufactured by the process of the invention is clearly evidenced by comparison of exchange current densities measured in a series of 9 photovoltaic cells of the type disclosed in International Patent Application WO 91/16719, each provided with a cathode prepared in the manner indicated in Example 2 (using, as a substrate for the deposition of platinum a plate of the same type as that indicated in Example 1, covered with a transparent continuous layer of electrically conducting tin oxide having a thickness of 0.3 microns), all the cells of this series being identical except in the manner according to which the metallic platinum was deposited on the cathode substrate and, if applicable, submitted to an ulterior thermal treatment, during the manufacture of the respective cathode used in the cell.

The same electrolyte is used in all the cells, namely a solution of 0.425 M methyl-ethyl-morpholinium iodide and 0.050 M iodine in n-methyl-oxazolidinone.

The platinum loading is the same, namely 4 micrograms/$cm^2$, on the substrate surface of each cathode The temperature of the heating step carried out for removing the organic ligand is also the sane, namely 300° C., in the case of all cathodes.

The temperatures of subsequent thermal treatment, carried out for improving the catalytic activity of the deposited platinum are all different, but the duration of this thermal treatment is the same, namely 10 minutes, in all cathodes.

The result of measurements of the values of exchange current, as well as the corresponding temperatures of thermal treatment of the cathode, are indicated in the following table (Table No. 1) for the respective cells:

TABLE 1

| Cell No. | Temperature of thermal treatment of the cathode (° C.) | Exchange current (mA/$cm^2$) |
| --- | --- | --- |
| 1 | 300 | 63 |
| 2 | 325 | 88 |
| 3 | 350 | 108 |
| 4 | 375 | 140 |
| 5 | 385 | 160 |
| 6 | 400 | 135 |
| 7 | 420 | 120 |
| 8 | 440 | 100 |
| 9 | 480 | 67 |

The above table shows that the exchange current has a maximum value in the case when the active surface of the cathode is submitted to a thermal treatment at a temperature of 385° C. subsequently to the step of removing the organic ligand in the preparation of the cathode.

By way of further comparative experiment, the value of exchange current density was measured in another cell (Cell No. 10) similar to cells Nos 1 to 9 but in which the metallic platinum was deposited onto the active cathode surface by electrodeposition instead of by the process indicated in Example 2 (said electrodeposition being however cried out so as to obtain the same platinum loading value of 4 micrograms by $cm^2$, as in the case of cells Nos 1 to 9, but in the form of a continuous (as seen by microscopic observations) platinum layer instead of the discrete microclusters of platinum formed in the case of the cathodes used in cells Nos 1 to 9).

The value of the exchange Brent density for cell No. 10 is only of about 1 mA/cm².

What is claimed is:

1. Process for manufacturing an electrode for an electrochemical device which comprises two electrodes, having corresponding electrochemically active surfaces arranged in mutual facing relationship and separated by a layer of an electrolyte, said electrode being manufactured being in contact with said electrolyte, said electrolyte comprising a solution of an electron transfer mediator, consisting of a redox system iodine ($I_2$)/iodide ($I^-$) in a solvent, said process comprising the step of depositing metallic platinum onto an electrically conductive substrate, wherein said metallic platinum is deposited in the form of a plurality of spheroidal microcrystallite clusters each having a size of less than 100 nanometers, dispersed over the surface of said substrate, and submitting thus deposited platinum to a thermal treatment, carried out at a temperature in the range of 375 to 400° C., so as to enhance the catalytic properties of the platinum on the oxido-reduction reaction of iodine and triiodide $3I_2 + 2e^- \leftrightarrows 2I_3^-$ in the redox system iodine/iodide.

2. Process according to claim 1, wherein said electrochemical device is a photovoltaic cell in which at least one of said electrodes has a visible light transmittance of at least 60% and said electrode being manufactured is the cathode of the photovoltaic cell, the other electrode of this cell consisting of a photoanode comprising a high surface area titanium dioxide active layer.

3. Process according to claim 1, comprising depositing said metallic platinum by thermal decomposition of a solution of at least one halogenated platinum compound.

4. Process according to claim 3, wherein said halogenated platinum compound is selected from platinum tetrachloride and hexachloroplatinic acid.

5. Process according to claim 3, wherein the thermal decomposition is carried out at a temperature in the range of 375 to 400° C.

6. Process according to claim 1, comprising depositing said metallic platinum by applying onto the substrate a suspension of fine particles of platinum, each having a size of less than 100 nanometers, in a liquid suspension medium and then heating the suspension so as to evaporate the liquid suspension medium.

7. Process according to claim 6, wherein said suspension further contains an organic ligand stabilizing agent for the platinum particles and in that the process comprises the steps of evaporating the liquid suspension medium by heating at a first temperature and then removing said ligand, after evaporation of the liquid suspension medium, by heating the dried suspension at a second temperature.

8. Process according to claim 7, wherein said first temperature is about 150° C. and said second temperature is in the range of 300 to 350° C.

9. Process according to claim 7, wherein said organic ligand is a salt of tetrabutylammonium.

10. Process according to claim 6, wherein said liquid suspension medium is dimethylformamide.

* * * * *

UNITED STATES PATENT AND TRADEMARK OFFICE
CERTIFICATE OF CORRECTION

PATENT NO. : 6,024,807
DATED : February 15, 2000
INVENTOR(S) : Nicholas Pappas; Michael Gratzel It is certified that error appears in the above-identified patent and that said Letters Patent is hereby corrected as shown below:

In column 1, line 15, please delete "a" and insert in lieu thereof --an--.

In column 1, line 58, please delete "tis" and insert in lieu thereof --this--.

In column 2, line 27, please delete "permit" and insert in lieu thereof --permits--.

In column 2, line 35, please delete "of" and insert in lieu thereof --or--.

In column 2, line 38, please delete "halving" and insert in lieu thereof --having--.

In column 2, line 53, please delete "beating" and insert in lieu thereof --heating--.

In column 3, line 3, please delete "surfaces" and insert in lieu thereof --surface--.

In column 3, line 5, please delete "plating" and insert in lieu thereof --platinum--.

In column 3, line 30, please delete "5 M" and insert in lieu thereof --5 mM--.

In column 3, line 31, please delete "iropropanol" and insert in lieu thereof --isopropanol--.

In column 4, line 25, please delete "sane" and insert in lieu thereof --same--.

In column 4, line 31, please delete "result" and insert in lieu thereof --results--.

In column 4, line 61, please delete "cried" and insert in lieu thereof --carried--.

In column 5, line 1, please delete "Brent" and insert in lieu thereof --current--.

UNITED STATES PATENT AND TRADEMARK OFFICE
CERTIFICATE OF CORRECTION

PATENT NO. : 6,024,807
DATED : February 15, 2000
INVENTOR(S) : Nicholas Pappas; Michael Gratzel It is certified that error appears in the above-identified patent and that said Letters Patent is hereby corrected as shown below:

In block 73, Assignee, please change "Polutechnique" to --Polytechnique--.

In column 5, line 17, please insert --the-- after "submitting".

In column 6, line 15, please insert --serving as-- after "ligand".

Signed and Sealed this

Tenth Day of October, 2000

Attest:

Attesting Officer

Q. TODD DICKINSON
*Director of Patents and Trademarks*